April 2, 1935.  E. H. BRUSH  1,996,273
MILK BOTTLE SAFE
Filed June 19, 1934
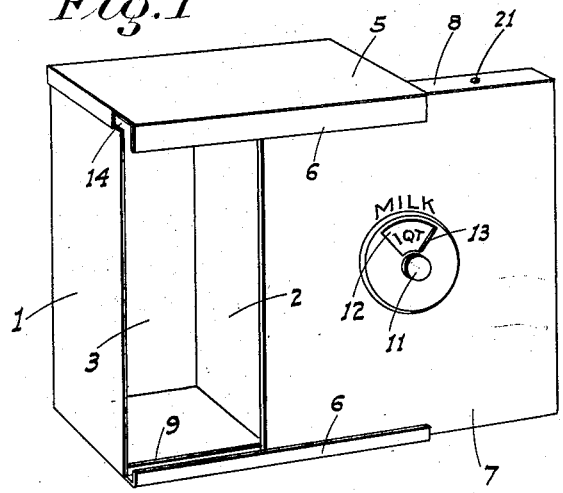
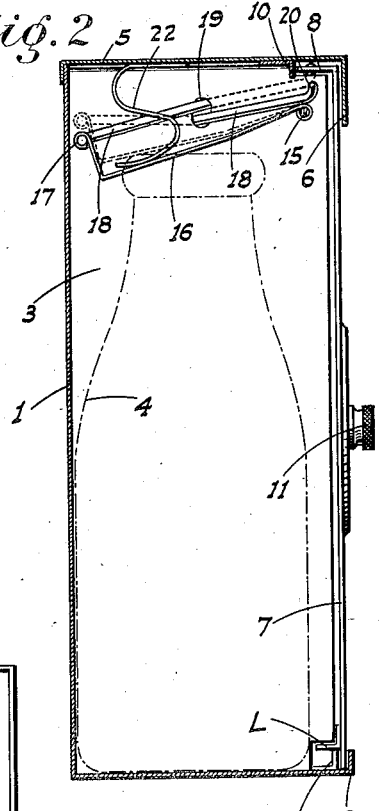
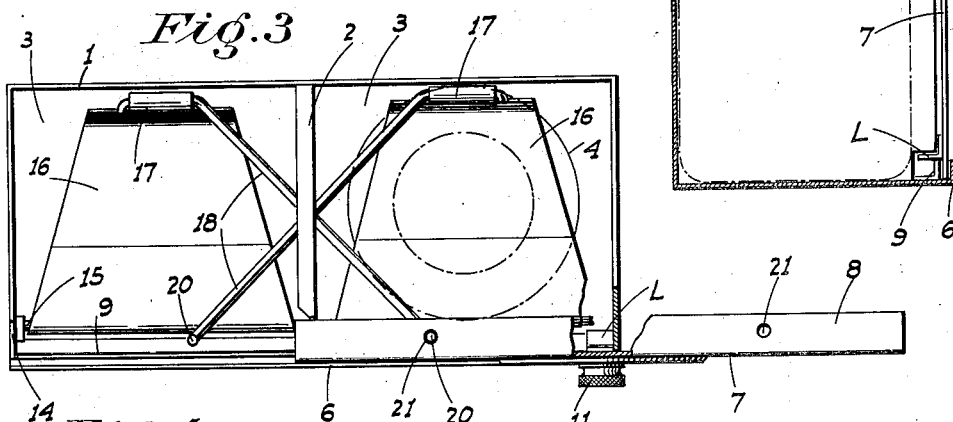
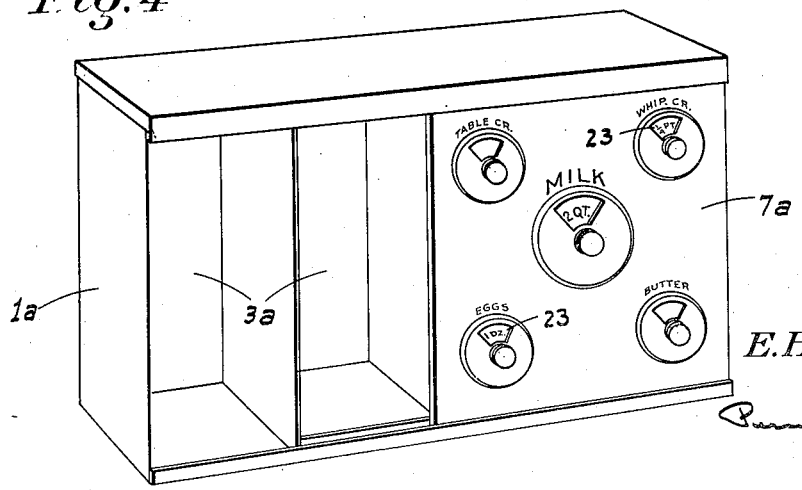
INVENTOR
E. H. Brush
ATTORNEY Patented Apr. 2, 1935

1,996,273

UNITED STATES PATENT OFFICE 1,996,273

MILK BOTTLE SAFE

Edwin H. Brush, Stockton, Calif.

Application June 19, 1934, Serial No. 731,300

2 Claims. (Cl. 232—41)

This invention relates to milk bottle safes or holders to be used in connection with the delivery of bottles of milk to homes, and which are now commonly left on the door step or other place where they are easily stolen or broken before being taken into the house.

One of the objects of my invention therefore is to provide a holder or safe adapted to be mounted in any convenient place accessible to the milk man, by means of which a bottle of milk when delivered is locked against theft and also maintained in a sanitary condition and so that it cannot be upset or broken.

It is usually the custom, and with certain firms compulsory, for the housewife to return an empty bottle for each filled one. The customer however sometimes forgets to put out an empty bottle and either does not receive a fresh supply of milk or the milk man must stand the loss of the bottle in exchange and is put to a constant expense for the purchase of new bottles. It also happens that no milk may be left even though the empty bottle has been put out, either through the theft of this bottle, or the oversight of the milk man.

It is therefore another object of my invention to provide a bottle holder which insures a proper interchange of bottles, in that the housewife cannot remove the full bottle unless she first puts an empty one in its place and similarly the milk man cannot get the empty bottle unless he puts a full bottle in its place. Also either bottle in the receptacle at any one time is automatically locked against removal. Not only therefore is the milk and the empty bottle kept from theft or breaking, but the return of the empty bottle is insured and possible misunderstandings and disputes as to delivery or nondelivery are avoided.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a perspective view of my improved safe with the door in its normal position.

Figure 2 is a transverse vertical section of the device.

Figure 3 is a top plan view of the same with the lid removed.

Figure 4 is a perspective view of a modified form of the safe.

Referring now more particularly to the characters of reference on the drawing, and particularly at present to Figures 1 to 3, the safe or holder is preferably made of sheet metal fashioned to form a rectangular structure 1 having a central vertical partition 2 dividing the holder into duplicate compartments 3 open to the front. Each compartment is of sufficient size to freely receive a standard milk bottle 4. The structure 1 includes a lid 5 which while initially a separate member, for convenience of assembly of the parts, is then permanently secured in place, preferably by welding.

The lid and the bottom of the safe are provided along their forward edges with flanges 6 projecting toward each other, which are disposed a short distance in front of the forward edges of the compartments.

The flanges form guide means for a door 7 the size of which is sufficient to cover the front of both compartments, but which when in use is adapted to only cover or close one compartment at a time. Along its upper edge the door is formed with a rearwardly projecting flange 8 for a purpose which will be seen later. The door is kept from inward movement by an upstanding flange 9 along the bottom of the compartments parallel to the adjacent flange 6 and between which the door moves, and a depending flange 10 along the lid 5 just back of the flange 8.

The door is slid back and forth by a knob 11 thereon which also forms a means to turnably adjust a quantity denoting dial 12 secured thereto and which is recessed in the door from behind and a portion of which is exposed through an opening 13 in the door. Since one end or the other of the door projects beyond the adjacent end of the safe to expose the opposite compartment, the lid and end walls of the safe as well as the partition 2 are slotted as at 14 to clear the flange 8. The movement of the door further than necessary to fully expose either compartment at a time is prevented by a stop lug L mounted on the door at the bottom centrally between its ends and adapted to engage with either end wall of the safe; the central partition 2 being recessed as shown in Figure 2 to permit of the free passage of the lug there past.

Extending between and supported from the end walls of the safe adjacent the front and above the height of a milk bottle is a rod 15, which forms a pivot for separate rearwardly extending plates 16, which of course extend into the compartments 3 in overhanging relation to the bottles therein. Sleeves 17 are formed on the plates at the back end of and above the plates which support the adjacent ends of latch rods 18. These rods extend in crossing relation to each other toward the front of the safe and in superposed relation through a hole 19 in the partition 2. The bottom wall of this opening forms a fulcrum for the lower rod while said lower rod at the opening forms the fulcrum for the upper rod.

The rods project to the front of the compartments back of the door and under the flange 8 where they are formed with upstanding latch pins 20 adapted to alternately engage holes 21 in the flange 8 only when the door is moved so that either compartment is fully opened. It is to be understood that when the door is in such position only one or the other of the latch pins can function as will be seen. By reason of the crossing arrangement of the latch rods it will be seen that the front ends of both rods and their latch pins are in the compartments opposite to those in which said rods are connected to the respective sleeves 17. By reason of what amounts to the pivotal mounting of the rods in the partition 2, as the rear end of either rod is lower its opposite end is raised, and vice versa.

The latch rods and pins and the plates to which they are connected are arranged so that when either plate is engaged by the top of a milk bottle said plate is raised sufficiently to lower the corresponding pin clear of the flange 8, as indicated in Figure 2. When a bottle is withdrawn from under the plate and the latter drops, the corresponding latch pin is raised to engage the hole 21 then in line with the pin. The weight of the plate 16 may of itself be enough to thus cause the dropping of the plate and the movement of the pin to a latching position, but to insure a positive movement I preferably mount suitable springs 22 on the lid 5 bearing down on the plates.

In operation one compartment is always filled while the other one is empty, the door being fast, to cover the occupied compartment, as shown in Figure 1. The exposed or open compartment being then empty, causes the latch pin controlled by the plate 16 of said compartment to engage a hole 21 in the door flange, preventing movement of the door to its opposite position and also preventing opening of the compartment which it now covers and which contains a bottle.

Assuming the closed compartment to contain an empty bottle, the milk man places a full one in the open empty compartment which immediately raises the corresponding plate 16, thus releasing the latch pin so that the door may be slid to its opposite position. This allows the milk man to remove the empty bottle therefrom, leaving the corresponding compartment empty. The removal of this bottle releases the adjacent plate 16 and causes the door to be again locked against movement from the position to which it was just moved. The housewife upon desiring to remove the full bottle must place another empty one in the now unoccupied compartment in order to again release the door and allow the same to be moved to expose the full bottle.

This operation again locks the door over the empty bottle and the safe is ready for a subsequent milk delivery. An advantage of this mode of operation is that there is no chance of a failure to put out an empty milk bottle as is the case when this is done the last thing at night as is usually the case and which is frequently forgotten.

If desired the safe 1a may be made with four compartments 3a as shown in Figure 4, only the two centrally locked compartments however having the door latching means as previously described, and the door 7a only covering the two endmost compartments at a time. This arrangement provides for the delivery of two bottles of milk or one bottle of milk and some extra article such as cream, cottage cheese or the like, which may be placed in the end compartment adjacent to that in which the milk is placed and before the door is moved to a closing position over the milk. In this manner such additional articles are kept sanitary and protected from theft.

With this structure, the door 7a may be provided with additional quantity and article indicating dials 23, for the various commodities other than milk, and by means of which the housekeeper may indicate her needs without having to see the delivery man or leave a note.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A milk bottle holder comprising a unitary pair of separate vertical open-fronted compartments each adapted to receive an individual bottle, a door mounted for sliding movement over the front of the compartments to alternately close the same, and releasable locking means between each compartment separately and the door, each such locking means comprising a plate hinged in the compartment at a level above a bottle and extending thence rearwardly and downwardly whereby the top of a bottle when inserted in said compartment will engage and raise the plate, a latch element attached to the plate adjacent its rear end and extending thence diagonally of the holder to the front of the other compartment, a latch pin upstanding from the forward end of the element, fulcrum means for the element intermediate its ends, and a flange on a longitudinally movable edge of the door overhanging said pin, the flange having an orifice to register with the pin when the door is in position to close said other compartment.

2. A milk bottle holder comprising a unitary pair of vertical open fronted compartments, each adapted to receive an individual bottle, a door mounted for sliding movement over the front of the compartments to alternately close the same, separate plates in the compartments at the top and hinged at the front thereof at a level above the top of a bottle and extending thence downwardly toward the rear whereby bottles inserted in the compartments will raise the corresponding plates at their back ends, separate locking means to engage the door when in either position, and connections between said plates and the separate locking means to release the latter by the raising of the plates.

EDWIN H. BRUSH.